June 5, 1928.
F. WARD
1,672,184
CUSHION FOR FARM IMPLEMENT SEATS
Filed March 4, 1927
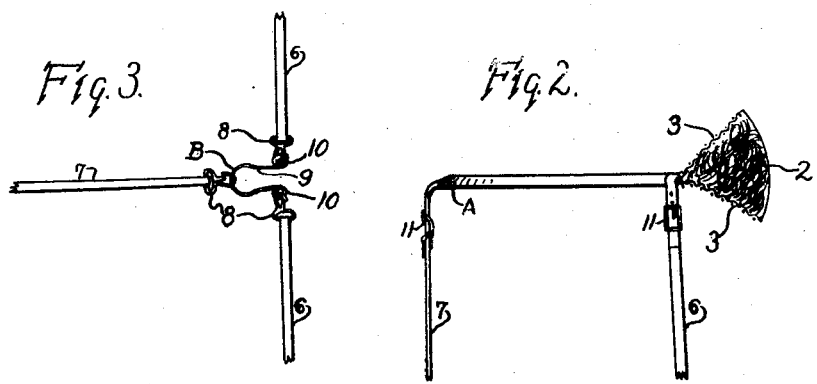
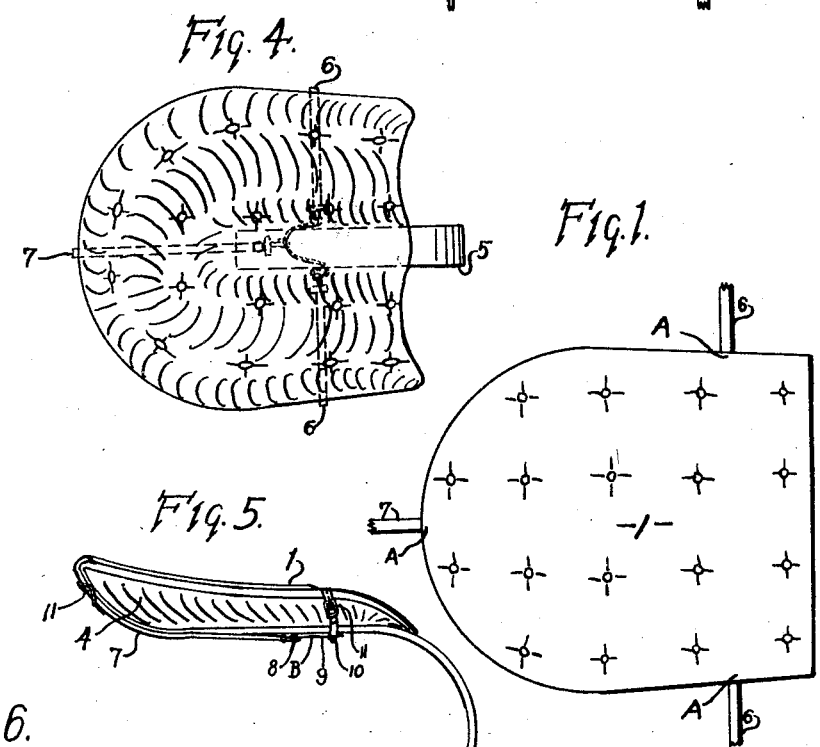
INVENTOR.
FENN WARD.
BY
ATTORNEY.

Patented June 5, 1928.

1,672,184

UNITED STATES PATENT OFFICE.

FENN WARD, OF WHEATON, KANSAS.

CUSHION FOR FARM-IMPLEMENT SEATS.

Application filed March 4, 1927. Serial No. 172,872.

My invention relates to a cushion for farm implement seats.

The object of my invention is to provide a cushion with attaching means to prevent undue removal from the implement seat.

A further object of my invention is to provide a flexible cushion that will conform to the shape of the seat when engaged by an occupant, and having anchoring straps as tensioning and securing means for the cushion to the seat.

A still further object of my invention is to provide an inexpensive cushion that is conveniently attached and removed from a farm implement seat that is made of metal.

These and other objects will hereinafter be more fully explained.

Referring to the drawings:

Fig. 1 is a plan view of the cushion.

Fig. 2 is an edge view.

Fig. 3 is a plan view of the anchor straps and resilient means.

Fig. 4 is a plan view of the cushion impressed into the metallic seat.

Fig. 5 is a side view of the seat, and a fragmentary part of the spring support for the seat.

Fig. 6 is a modification of the spring tensioning means.

The cushion 1 herein disclosed consists of a fibrous or hair filling 2 having a fabric or leather cover 3, the contour of which may conform to the general contour of the seat to which it is applied. The illustration herein disclosed shows an iron seat 4 carried by a spring 5. Positioned in the seat is the cushion 1 secured thereto by means of straps 6 and 7, the said straps being attached to the cushion as shown at A, the opposite ends having a spring snap 8 attached thereto by a loop formed in the end of said strap by lapping back on itself and being riveted or sewed. The said straps are adapted to engage with a leaf spring 9 which is U-shaped and having a bend on the end thereof to form an eye as at 10 in which the snaps of the strap 6 engage and are tensioned transversely to the seat. The snap of strap 7 will engage with the loop of the spring as shown at B, and transversely extending from the first said strap, all of which are positioned and engaged with the under side of the seat as shown in Fig. 5.

As an adjusting means for the length of the straps I have provided buckles 11 by which means the cushions may be attached to seats of different size. The cushion is shown to have tufting button, other means may be employed to secure the filling uniformly in the cover.

When the seat is disengaged the tension of the leaf spring inclines to stretch the cushion causing the center portion to rise from the seat, and at all times the tension is sufficient to retain the cushion in its proper position ready for occupancy. Furthermore the tensioning means will prevent the cushion from removal when the implement is being moved without an occupant in the seat.

Such modifications may be employed as lie within the scope of the appended claim.

I am aware that cushions have been made heretofore for seats, but such I do not claim broadly, but what I claim as new and desire to secure by Letters Patent is:

In a cushion for farm implement seats, a cushion of the kind described, to line the interior of the seat, a strap attached to the opposite edges of the seat and near the front thereof, spring snaps on the free ends of the straps, a U-shaped spring having eyes on the ends thereof to engage the hooks as tensioning means for the straps, a strap attached to the rear edge of the cushion, and a spring snap on the free end thereof to engage in the U bend of the spring, the said spring and snaps to engage on the under side of the implement seat as securing and tensioning means for the cushion on the opposite side or top of the seat, all as, and for the purpose described.

In testimony whereof I affix my signature.

FENN WARD.